3,325,716
REGULATED POWER SUPPLY
Yoshiyuki Gomi, Chiyoda-ku, Tokyo, Japan, assignor to K.K. Chiyoda, Tokyo, Japan, a corporation of Japan
Filed Oct. 14, 1964, Ser. No. 403,703
2 Claims. (Cl. 321—2)

This invention relates to rectifiers to be used to convert alternating currents to direct currents. It is as well known that, in a conventional semiconductor rectifier, an input alternating current power is converted to be of a proper voltage by means of a transformer and is rectified. With a great progress of the semiconductor industry, semiconductor rectifiers have been made very small but, on the other hand, their transformers for power conversion and filters have not yet been able to be made smaller and the volume of the entire rectifier, has not yet been made smaller.

In view of such fact, the present invention is to obtain a large current of a low voltage by first rectifying an alternating current input with a rectifier of, for example, silicon or any other semiconductor so as to obtain a direct current of a high voltage, then causing a rectangular wave oscillation with a high frequency (of several hundred or several kilocycles) by using said direct current as a power source, converting the current to be of a proper voltage and again rectifying it. Thereby, not only the main transformer can be made very small but also the filter can be made smaller. It is therefore needless to say that, in the present invention, the loss is smaller than in the conventional transformer and the efficiency of the entire apparatus can be greatly improved. It is as already known to generate an alternating current from a direct current source by a static means. But it has been difficult to generate a large power with a vacuum tube, transistor or the like. In the case of using a silicon controlled rectifier element to generate an alternating current of a large power output, it has been very difficult to freely vary the effective power from zero to the rated value by freely varying its on-off duty ratio. The present invention is a success in obtaining an oscillating apparatus by varying the duty of the controlled rectifier easily by an entirely electronic means in such case.

A principal object of the present invention is to provide a very small regulated power supply.

Another object of the present invention is to provide a regulated power supply high in the efficiency and response speed.

Figure 1:
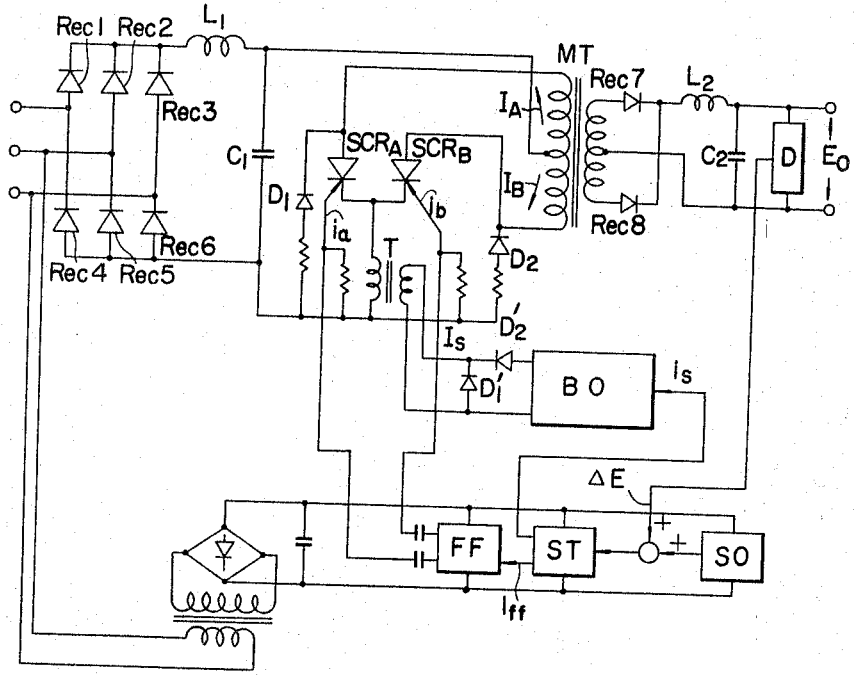

An embodiment of the present invention shall now be explained with reference to the drawings in which:

FIGURE 1 is a circuit diagram embodying present invention.

Figure 2A:
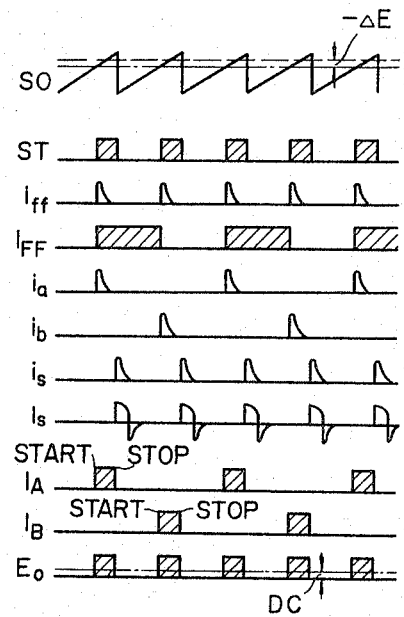
Figure 2B:
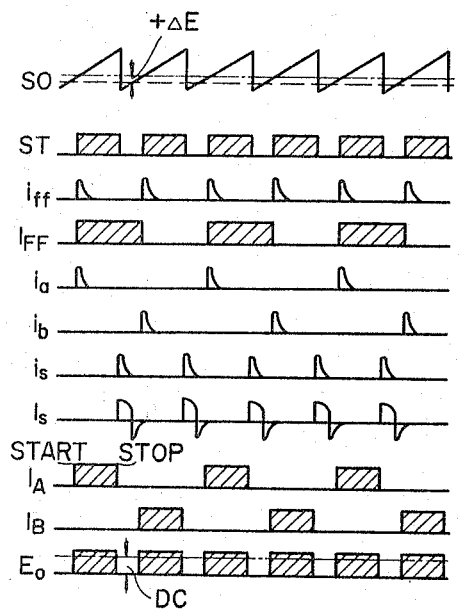

A and B of FIGURE 2 are current wave form views for explaining the operation in FIGURE 1.

In FIGURE 1, Rec. 1, Rec. 2, Rec. 3 . . . Rec. 7 and Rec. 8 are respective rectifiers, $L_1$ and $L_2$ are choke coils, $C_1$ and $C_2$ are condensers, $SCR_A$ and $SCR_B$ are silicon controlled rectifier elements, $D_1$, $D_2$, $D'_1$ and $D'_2$ are semiconductor diodes, MT is a comparatively high frequency main transformer, T is a turn-off transformer, D is a voltage detector, BO is a blocking oscillator, FF is a binary flip-flop circuit, ST is a Schmitt trigger circuit and SO is a saw tooth wave form oscillator.

The present invention is formed as illustrated. Its operation shall now be explained. When, for example, an input three-phase alternating current of 50 cycles/sec. at 200 volts, is rectified with the rectifiers Rec.1, Rec. 2 . . . Rec. 6, a direct current of 250 volts will be obtained at both ends of the condenser $C_1$.

The circuit formed of the main transformer or oscillating transformer MT the silicon controlled rectifier elements, $SCR_A$ and $SCR_B$ and the turn-off transformer T which is also a commutation reactor forms a rectangular wave inverter. If the ratio of the number of turns of the primary that of the secondary winding of the main transformer MT is, for example, 5:1, when the duty is 100%, the direct current output voltage will be about 50 volts. In the case of rectifying rectangular waves, if the amplitudes of the included harmonic waves are small and further the oscillating frequency of the inverter is taken to be well higher (for example, to be 400 cycles/sec. to 2 kilocycles/sec.) than the commercial power frequency, it will be possible to make the filters $L_2$ and $C_2$ small enough.

Further, as evident from the formula of the electromotive force of a transformer:

$$E = 4.44\, FNAB_m \times 10^{-8} \text{ (volts)}$$

wherein $F$ = frequency,
$A$ = cross-sectional area of the iron core, and
$B_m$ = maximum magnetic flux density, in a transformer of high frequency, the number of turns or the cross-sectional area of the iron core can be reduced inversely proportionally. Therefore, it is needless to say that the main transformer MT can be made very small. It is shown that, for example, a transformer of 10 kilowatts at 500 cycles/sec. (of a secondary output of 200 amperes at 50 volts) can be manufactured to be a little larger than a transformer of 1 kilowatt at 50 cycles/sec. (a capacity of 1/10).

The rectifier of an output of 200 amperes at 50 volts exemplified here is of a capacity sufficient to drive a relay system computer or relay system A.C. network analyzer using, for example, 2000 relays, an automatic numerical control device for industrial machines or a telephone switchboard for several thousand circuits in a telephone power plant. The output voltage is controlled by varying the on-off duty ratios of the silicon controlled rectifiers $SCR_A$ and $SCR_B$. Now, in order to take out a direct current output of 200 amperes at 50 volts, the direct current power on the input side of the inverter may be about 10 kilowatts. This means that, in the direct current output of 250 volts in the above mentioned example, a current of 40 amperes may be taken out. Therefore, it is evident that 20 amperes at 500 volts (average) will be sufficient for each of the silicon controlled rectifiers $SCR_A$ and $SCR_B$ and that 14 amperes at 300 volts will be sufficient for each element of Rec.1, Rec. 2, Rec. 3 . . . Rec. 6.

That is to say, it is a principal object of the present invention to make the transformer and filter small by utilizing silicon diodes and silicon controlled rectifiers of small currents and high voltages and to control the voltage by controlling the on-off duty ratio of each silicon controlled rectifier. An embodiment of the control shall be explained in detail in the following.

D in the drawing is an output voltage detector. This circuit is formed of a bridge circuit including a very common Zener diode on one side and a differential transistor amplifier for amplifying the error voltage obtained from it so that, even if the direct current voltage of 50 volts fluctuates by 1%, a controlled signal voltage of more than 10 volts may be obtained from the detector circuit. SO is a saw tooth wave form generator. Its frequency is selected to be of a proper value of 400 cycles/sec. to 2 kilocycles/sec.

The output voltage generated from peak to peak is made 10 to 15 volts. This signal as added as a direct current to the error signal voltage obtained from the detection circuit D is added to the Schmitt trigger circuit ST of a transistor type as of a wave form of SO shown in FIGURE 2.

It is well known that, for a signal higher than a fixed level, that Schmitt trigger will be triggering and will present an output shown by ST in FIGURE 2. That is to say, the error signal of the detection circuit D will be converted to a pulse width. If the amplitude of the output of the Schmitt trigger is 10 to 15 volts, it will be sufficient for the operation of the present invention. In order to make the connection of each circuit effective, an emitter follower circuit or the like may be properly inserted.

When the wave form shown by $i_{ff}$ in FIGURE 2 is obtained by taking out a differential signal by passing through a C-R series circuit and is further put into an ordinary flip-flop circuit FF in FIGURE 1, as one flip-flop output, such output wave form as is shown by $I_{FF}$ in FIGURE 2 will be obtained as well known, its amplitude will be substantially equal to the source voltage of the flip-flop circuit and, in this example, about 20 volts will be obtained.

If the respective outputs of "1" and "0" of the flip-flop are taken out through the C-R series circuit and are added to the control terminal of the silicon controlled rectifier, the control signals flowing through the control terminal will be in the wave forms shown by $i_a$ and $i_b$ in FIGURE 2 and their maximum amplitudes will be 20 to 50 milliamperes and will be sufficient to connect the silicon controlled rectifier.

On the other hand, the differential wave form of the tail end of the Schmitt trigger wave will be such as $i_s$ in FIGURE 2. When this current wave form is added to the blocking oscillator, a comparatively large turn-off pulse, for example, of several tens of watts will be able to be generated. This pulse is added in the turn-off direction to the turn-off transformer T through the diodes $D_2$ and $D_1$. The insertion of these diodes $D_1$ and $D_2$ has a very great significance. That is to say, when the silicon controlled rectifiers $SCR_A$ and $SCR_B$ start an on-operation with either of the starting pulses $i_a$ and $i_b$, a pulse will be generated on the secondary side of the turn-off transformer T and thereby the blocking oscillator will be misoperated. In order to prevent it, the insertion of the above mentioned diodes $D_1$ and $D_2$ is effective. In such case, the diode $D_1$ will short-circuit the current of the silicon controlled rectifier circuit, the diode $D_2$ will be off and therefore the blocking oscillator will not be obstructed at all.

On the other hand, when the turn-off pulse is added from the blocking oscillator, the diode $D_2$ will be in the normal direction and will not be an obstruction at all and the diode $D_1$ will be in the reverse direction and will not turn off the electric power. That is to say, the electric power will be transmitted faithfully from the blocking oscillator to the silicon controlled rectifier side but will not be transmitted at all in the reverse direction. Thus, by the starting pulses $i_a$ and $i_b$, the silicon controlled rectifiers $SCR_A$ and $SCR_B$ will be on, respectively, and, by the stop pulse $I_S$, the common point of the cathode of the silicon controlled rectifier will become so high in electric potential as to be of instantaneous plus several hundred volts, will cut off either one of the connected silicon controlled rectifiers and will turn it off each time. Therefore, if the pulse width of the Schmitt trigger is varied with the fluctuation of the direct current output voltage and its differential output or the relative position of each starting pulse and turn-off pulse is freely varied, the on-off duty ratio of the silicon controlled rectifier SCR will be able to be freely varied. Therefore, the direct current output can be freely controlled. The current wave forms in the above mentioned case are as shown in FIGURE 2. In FIGURE 2, A and B show the cases of low and high outputs, respectively. In the drawing, $I_A$ and $I_B$ represent current wave forms of the silicon controlled rectifier elements $SCR_A$ and $SCR_B$, respectively. $E_o$ represents a direct current output wave form. D.C. illustrated therein represents an average value of a direct current voltage passing through the filter. Thus any size of the direct current can be obtained as in the above.

The apparatus of the present invention is formed and operates as described above. Therefore, for example, if a main transformer of 20 kilowatts, at 50 cycles/sec. in a conventional apparatus of this kind is replaced with an oscillation output transformer of 1 kilocycle in the apparatus of the present invention, as the output is theoretically inversely proportional to the frequency, $$20 \text{ kw.} \times \frac{50 \text{ c./s.}}{1 \text{ kc.}} = 1 \text{ kw.}$$

That is to say, with the same size as a transformer of 1 kilowatt at 50 cycles/sec. a transformer of 20 kilowatts at 1 kilocycle/sec. can be manufactured. Therefore, the same copper loss as in a transformer of 1 kilowatt will be caused at 20 kilowatts at 1 kilocycle/sec.

Thus, the copper loss will be greatly reduced as compared with the output capacity.

Further, as the weight of the iron core is 1/20 (50 cycles/sec. to 1 kilocycle/sec.), the frequency will be so high that the iron loss per kilograms will be larger as compared with 50 cycles/sec. but, will be small enough as a whole. Therefore, as compared with the output capacity, the loss is very small and the efficiency of the entire apparatus is very high. The above mentioned can be said also of the filter, choke coil and condenser. As $\omega^2 LC = 1$ is a cutoff frequency of the filter, if $\omega$ is elevated from 50 cycles/sec. to 1 kilocycle/sec. or to be 20 times as high, the product of L by C will be $$\frac{1}{20^2} = \frac{1}{400}$$

that is to say, the filter will be able to be made small to 1/400.

In the apparatus of the present invention, as mentioned above, the main transformer can be made very small, the filter can be also made small, the loss is smaller than in any conventional apparatus of this kind and the efficiency of the entire apparatus can be improved to be very high.

The present invention is to make such power source apparatus of a comparatively low voltage and large current as, for example, a power source for electroplating (100 to 20,000 amperes at 3 to 20 volts), for electrolyses (1000 to 100,000 amperes at 20 to 80 volts), for relay system automatic control devices (10 to 1000 amperes at 24 to 48 volts), for railway signals (5 to 100 amperes at 24 to 48 volts) or for telephone switchboards (10 to 2000 amperes at 24 to 48 volts) small, light and highly efficient. According to the present invention, as compared with those of a conventional rectifier of the same capacity, the volume and weight can be made smaller to 1/3 to 1/5 and the efficiency of about 80% can be increased to about 90 to 95%.

Further, the present invention has great advantages that the voltage control (voltage stabilization) is entirely a noncontact linear control and that the regulating (response) speed is much higher than in any conventional magnetic amplifying system.

Therefore, the present invention has great industrial effects that have never been seen before.

What is claimed is:

1. A regulated power supply comprising a rectifier for directly rectifying an alternating current power without a transformer for converting a commercial electric power, two silicon controlled rectifiers operatively connected to a main transformer to which silicon ocntrolled rectifiers and output from said rectifier is added and which operate alternately, a main rectifier to which high frequency oscillating outputs from said silicon controlled rectifiers are added, a voltage detector for detecting a voltage obtained by rectifying an output from said main transformer, a saw tooth form wave oscillator provided separately from said detector, a trigger circuit to which is added a sum of output voltages from said saw tooth form wave oscillator and voltage detector, a binary flip-flop circuit to which is added an output from said trigger circuit, a blocking circuit and a turn-off transformer inserted in the cathode circuit of said silicon controlled rectifiers, the sum of both output voltages from said voltage detector and saw tooth form wave oscillator being added to said trigger circuit to modulate the pulse width, and output from said trigger circuit being added to said binary flip-flop circuit to alternately operate said silicon controlled rectifier elements and a tail end pulse of said trigger circuit being added to said blocking circuit to turn off said controlled rectifiers.

2. A regulated power supply according to claim 1 wherein a diode is inserted between the blocking circuit and the turn-off transformer to faithfully transmit an electric power from the blocking circuit to the silicon controlled rectifier side but to transmit no power in the reverse direction.

References Cited

UNITED STATES PATENTS 3,061,741   10/1962   Eckerman et al. _____ 321—2 X

JOHN F. COUCH, *Primary Examiner.*

W. H. BEHA, *Assistant Examiner.*